United States Patent
Lee et al.

(10) Patent No.: US 12,275,071 B2
(45) Date of Patent: Apr. 15, 2025

(54) CUTTING INSERT AND CUTTING TOOL HAVING SAME MOUNTED THEREON

(71) Applicant: KORLOY INC., Seoul (KR)

(72) Inventors: Nam Seon Lee, Cheongju-si (KR); Ki Chan Nam, Cheongju-si (KR); Tae Kyun Kim, Cheongju-si (KR); Young Heum Kim, Cheongju-si (KR)

(73) Assignee: KORLOY INC., Seoul (KR)

( * ) Notice: Subject to any disclaimer, the term of this patent is extended or adjusted under 35 U.S.C. 154(b) by 208 days.

(21) Appl. No.: 18/251,456

(22) PCT Filed: Aug. 26, 2021

(86) PCT No.: PCT/KR2021/011458
§ 371 (c)(1),
(2) Date: May 2, 2023

(87) PCT Pub. No.: WO2022/131480
PCT Pub. Date: Jun. 23, 2022

(65) Prior Publication Data
US 2024/0001462 A1     Jan. 4, 2024

(30) Foreign Application Priority Data
Dec. 14, 2020   (KR) .................. 10-2020-0174171

(51) Int. Cl.
*B23C 5/02*     (2006.01)
*B23C 5/20*     (2006.01)

(52) U.S. Cl.
CPC ............... *B23C 5/02* (2013.01); *B23C 5/205* (2013.01); *B23C 2200/28* (2013.01)

(58) Field of Classification Search
CPC .. B23C 5/02; B23C 5/06; B23C 5/165; B23C 5/205; B23C 5/20; B23C 2200/08;
(Continued)

(56) References Cited

U.S. PATENT DOCUMENTS

| 2007/0003384 A1* | 1/2007 | Smilovici | B23C 5/2213 407/113 |
| 2010/0150671 A1* | 6/2010 | Oprasic | B23C 5/202 407/42 |

(Continued)

FOREIGN PATENT DOCUMENTS

JP        2014136264 A    7/2014

Primary Examiner — Nicole N Ramos
(74) Attorney, Agent, or Firm — Rabin & Berdo, P.C.

(57) ABSTRACT

A cutting insert according to an embodiment of the present invention is a double-sided cutting insert comprising an upper surface, a lower surface, a side surface, a cutting edge, and a mounting hole penetrating the upper surface and the lower surface, in which the upper surface is provided with a single upper surface boss portion that surrounds the mounting hole and is flat, the cutting edge includes a main cutting edge, a corner cutting edge extending from the main cutting edge, a sub-cutting edge extending from the corner cutting edge, and a side portion extending from the sub-cutting edge, a first main cutting edge flank surface extending from the main cutting edge forms an acute angle with an extension line of the upper surface boss portion, a sub-cutting edge chip breaker surface extending from the sub-cutting edge is at a gradually increasing angle with the extension line of the upper surface boss portion, as the sub-cutting edge chip breaker surface is distanced away from the corner cutting edge, and when the cutting insert is viewed into the upper surface, a side portion surface extending from the side portion is concavely recessed.

7 Claims, 13 Drawing Sheets

(58) Field of Classification Search
CPC .......... B23C 2200/083; B23C 2200/12; B23C 2200/20; B23C 2200/208; B23C 2210/082
See application file for complete search history.

(56) References Cited

U.S. PATENT DOCUMENTS

| | | | |
|---|---|---|---|
| 2012/0093596 A1* | 4/2012 | Ishi | B23C 5/202 407/113 |
| 2013/0294850 A1* | 11/2013 | Park | B23C 5/22 407/113 |
| 2013/0336732 A1* | 12/2013 | Jansson | B23C 5/06 407/113 |
| 2014/0041495 A1* | 2/2014 | Koga | B23B 27/18 83/13 |
| 2014/0212229 A1* | 7/2014 | Diepold | B23C 5/205 407/42 |
| 2017/0282262 A1* | 10/2017 | Burtscher | B23C 5/06 |
| 2019/0176250 A1* | 6/2019 | Tsujimoto | B23C 5/202 |

\* cited by examiner

A-A section    B-B section    C-C section ( θ1 < θ2 < θ3 )

(a)

G-G section ( β = 90° )

(b)

H-H section ( γ < 90° )

(c)

(a)

(b)

(a)

(b)

(c)

(d)

CUTTING INSERT AND CUTTING TOOL HAVING SAME MOUNTED THEREON

TECHNICAL FIELD

The present invention relates to a cutting insert and a cutting tool equipped with the same.

BACKGROUND ART

Generally, a cutting insert is mounted to a cutting tool mounted to a machine tool and used for cutting a workpiece such as a machine part and so on that is made of iron, non-ferrous metal, non-metal material, and so on. Such a cutting insert includes an upper surface, a lower surface oriented in the opposite direction, side surfaces joining the upper surface and the lower surface to each other, and a cutting edge forming a boundary between the upper surface and the side surface and configured substantially to cut a workpiece.

Meanwhile, the main challenge associated with processing a workpiece such as stainless steel with heat resistance and toughness is that chip disposability is poor. In order to process tough and weldable workpieces, it is necessary to improve the cutting quality of the tool and ensure a large chip pocket.

FIGS. 12 and 13 show a cutting insert disclosed in JP2014-136264A. For reference, FIGS. 12 and 13 correspond to FIGS. 9 and 10 of JP2014-136264A respectively, and for convenience of description, reference numerals used in JP2014-136264A are used as they are without modification, and the reference numerals do not necessarily refer to the same components even if they overlap with the reference numerals used in the following description of the embodiments of the present invention.

The related cutting insert mentioned above employs a helix-type oblique cutting edge structure to improve the cutting quality, but it requires that the upper mounting surface 13 is formed higher than the lowest part of the cutting edge, and the chip breaker surface of the sub-cutting edge 9 is formed at a single angle. Therefore, although the related cutting insert can improve the cutting quality, there is a problem in that it is not suitable for processing difficult-to-cut materials, because the fluidity of the chips is not considered when shaping the chip breaker surface and cutting edge.

DETAILED DESCRIPTION OF INVENTION

Technical Problem

The present invention has been made to solve the problems described above, and an object of the present invention is to provide a cutting insert capable of ensuring good flow of chips by constructing the cutting insert such that the chips are not jammed during chip flow, and a cutting tool equipped with the same.

Technical Solution

In order to achieve the above object, a cutting insert according to an embodiment of the present invention is a double-sided cutting insert comprising an upper surface, a lower surface, a side surface, a cutting edge, and a mounting hole penetrating the upper surface and the lower surface, in which the upper surface may be provided with a single upper surface boss portion that surrounds the mounting hole and is flat, the cutting edge may include a main cutting edge, a corner cutting edge extending from the main cutting edge, a sub-cutting edge extending from the corner cutting edge, and a side portion extending from the sub-cutting edge, a first main cutting edge flank surface extending from the main cutting edge may form an acute angle with an extension line of the upper surface boss portion, a sub-cutting edge chip breaker surface extending from the sub-cutting edge may be at a gradually increasing angle with the extension line of the upper surface boss portion, as the sub-cutting edge chip breaker surface is distanced away from the corner cutting edge, and when the cutting insert is viewed into the upper surface, a side portion surface extending from the side portion may be concavely recessed.

In addition, a main cutting edge chip breaker surface of the main cutting edge may be at a gradually decreasing angle with the extension line of the upper surface boss portion, as the main cutting edge chip breaker surface is distanced away from the corner cutting edge.

In addition, a sub-cutting edge flank surface of the sub-cutting edge may form a right angle with the extension line of the upper surface boss portion, and an angle formed by a corner cutting edge flank surface of the corner cutting edge and the extension line of the upper surface boss portion may vary along the corner cutting edge.

In addition, when the cutting insert is viewed into the side surface, the main cutting edge may be inclined downward in a direction away from the corner cutting edge, and the upper surface boss portion may not be higher than a lowest part of the main cutting edge.

In addition, when the cutting insert is viewed into the side surface, the sub-cutting edge may be inclined downward in a direction away from the corner cutting edge, and the side portion extending from the sub-cutting edge may form a concave curve in a direction of the lower surface.

In addition, the cutting insert may be 180° rotationally symmetric about a first central axis passing through a center of the mounting hole, and 180° rotationally symmetric about a second central axis passing through a center of the side surface.

A cutting tool equipped with the cutting insert described above may include a main body including a flange portion and a tip portion, a plurality of insert mounting portions protruding radially from the main body, spaced apart from each other at predetermined intervals, and having a seat portion on which the cutting insert is mounted, in which, when the cutting tool is viewed from a side, upper surfaces of the plurality of insert mounting portions may be concavely formed in a curved surface.

Advantageous Effects

The cutting insert according to the embodiment of the present disclosure having the configuration described above has the following effects.

The sub-cutting edge chip breaker surface is at an increasing angle with the upper surface boss portion as the sub-cutting edge chip breaker surface is distanced away from the corner cutting edge, and when viewed into the upper surface, the surface of the side portion is concavely recessed such that during the workpiece processing, it is possible to ensure good chip disposability by minimizing jamming of the chips generated from the workpiece in the direction in which the chips flow.

In addition, the main cutting edge chip breaker surface of the main cutting edge is at a decreasing angle with the extension line of the upper surface boss portion, as the main cutting edge chip breaker surface is distanced away from the corner cutting edge, thereby ensuring the rigidity of the cutting edge of the main cutting edge during high-cut processing.

In addition, when the cutting insert is viewed into the side surface, the main cutting edge is inclined downward in a direction away from the corner cutting edge, and the upper surface boss portion is not higher than the lowest part of the main cutting edge, thus minimizing the collision of the chips with the upper surface boss during cutting and improving the fluidity of the chips.

In addition, when the cutting insert is viewed into the side surface, the sub-cutting edge is inclined downward from the upper surface to the lower surface in the direction away from the corner cutting edge, and the side portion extending from the sub-cutting edge forms a concave curve in the direction of the lower surface, thus minimizing the chip getting caught on the side portion during cutting and improving the fluidity of the chips.

Meanwhile, it goes without saying that the present invention includes other effects, although not explicitly stated, that can be expected from the configuration described above.

BEST MODE FOR EMBODYING INVENTION

Hereinafter, preferred embodiments of the present invention will be described in detail with reference to the accompanying drawings, which will be readily apparent to those skilled in the art to which the present invention pertains. However, it will be understood that the present invention can be implemented in various other different forms and should not be construed as being limited to certain examples described herein.

Meanwhile, in the present embodiment, by the "double-sided cutting insert," it refers to a cutting insert in which an upper surface that can be used as a rake surface when the lower surface is used as a mounting surface for the cutting tool, and conversely, a lower surface can be used as the rake surface when the upper and lower surfaces of the cutting insert are reversed so that the upper surface is used as the mounting surface for the cutting tool. Accordingly, although an example in which the upper surface is used as the rake surface and the lower surface located on the opposite side is used as the mounting surface for the cutting tool will be described below for convenience of explanation, it will be understood that the same may be applicable when this is reversed.

Figure 1:
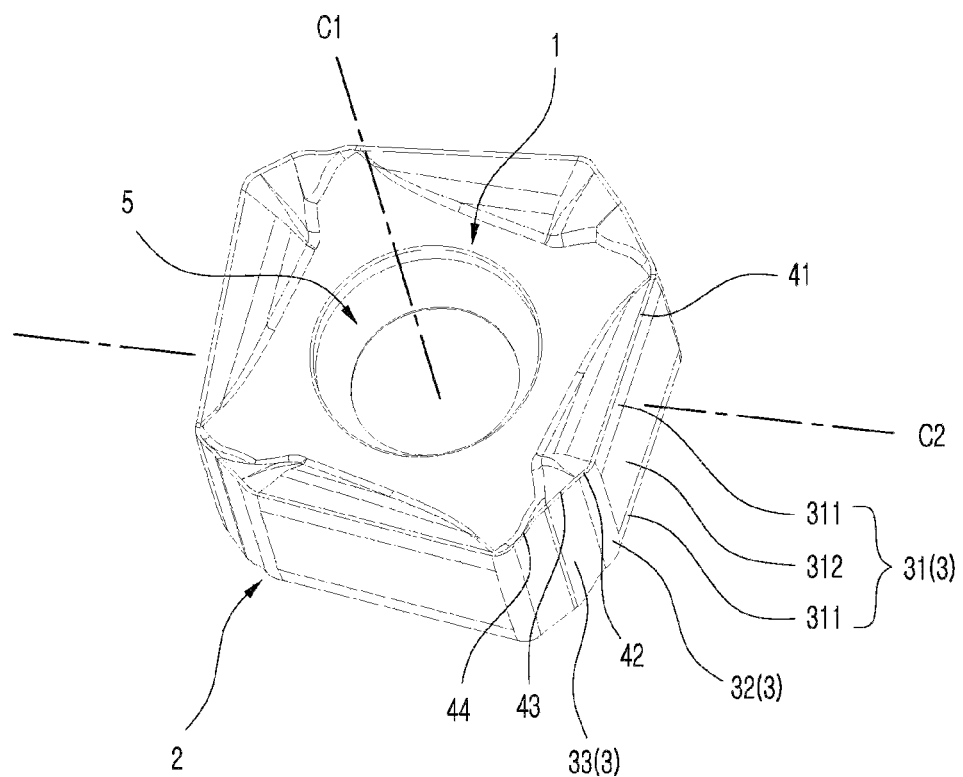
FIG. 1 is a perspective view of a cutting insert according to an exemplary embodiment of the present invention.
Figure 2:
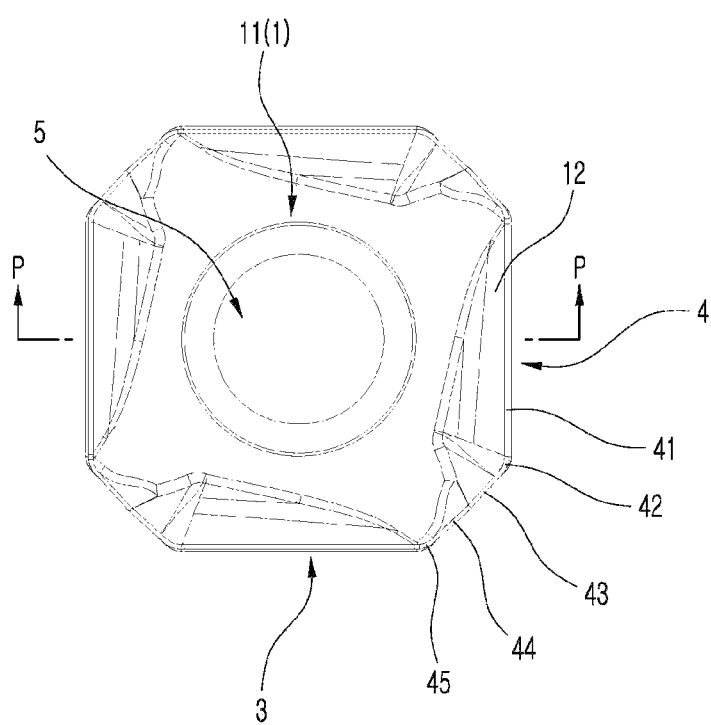
FIG. 2 is a view of the cutting insert of FIG. 1 viewed into an upper surface.

As shown in FIGS. 1 and 2, a cutting insert according to one embodiment of the present invention (hereinafter, simply referred to as 'cutting insert') is a double-sided cutting insert, and includes an upper surface 1, a lower surface 2, side surfaces 3, cutting edges 4, and a mounting hole 5 penetrating the upper surface 1 and the lower surface 2.

When viewed into the upper surface (see FIG. 2), the cutting insert has a substantially rectangular shape, for example, and at each of the four corners, there are active corner edges 42 involved in cutting during workpiece cutting and inactive corner edges 45 not involved in cutting. Therefore, the cutting insert may use a total of 8 corners on both sides.

Figure 3:
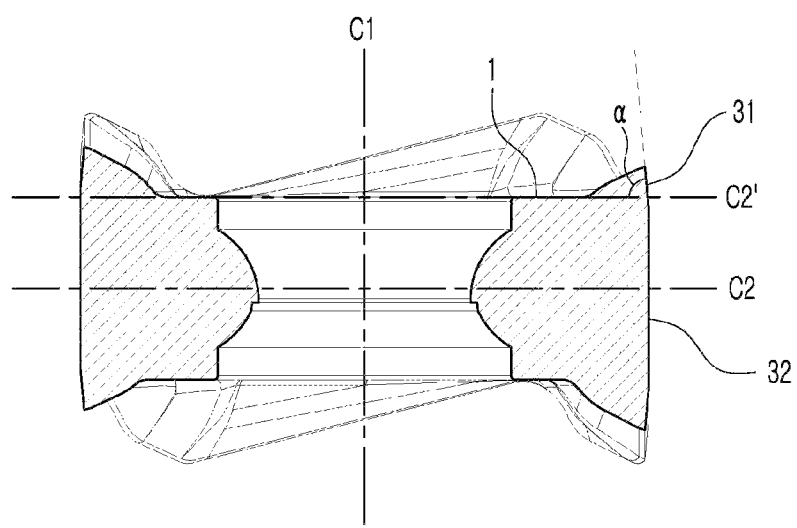
FIG. 3 is a cross-sectional view in the direction P-P of FIG. 2.

The upper surface 1 has an upper surface boss portion 11 that surrounds the mounting hole 5 and is flat. As shown in FIG. 3, the upper surface boss portion 11 is parallel to an imaginary second central axis C2 passing through the center of the side surface 3.

The cutting edges 4 include a main cutting edge 41, a corner cutting edge 42 extending from the main cutting edge, and a sub-cutting edge 43 extending from the corner cutting edge. In addition, a side portion 44 extending from the sub-cutting edge 43 is provided.

Figure 7:
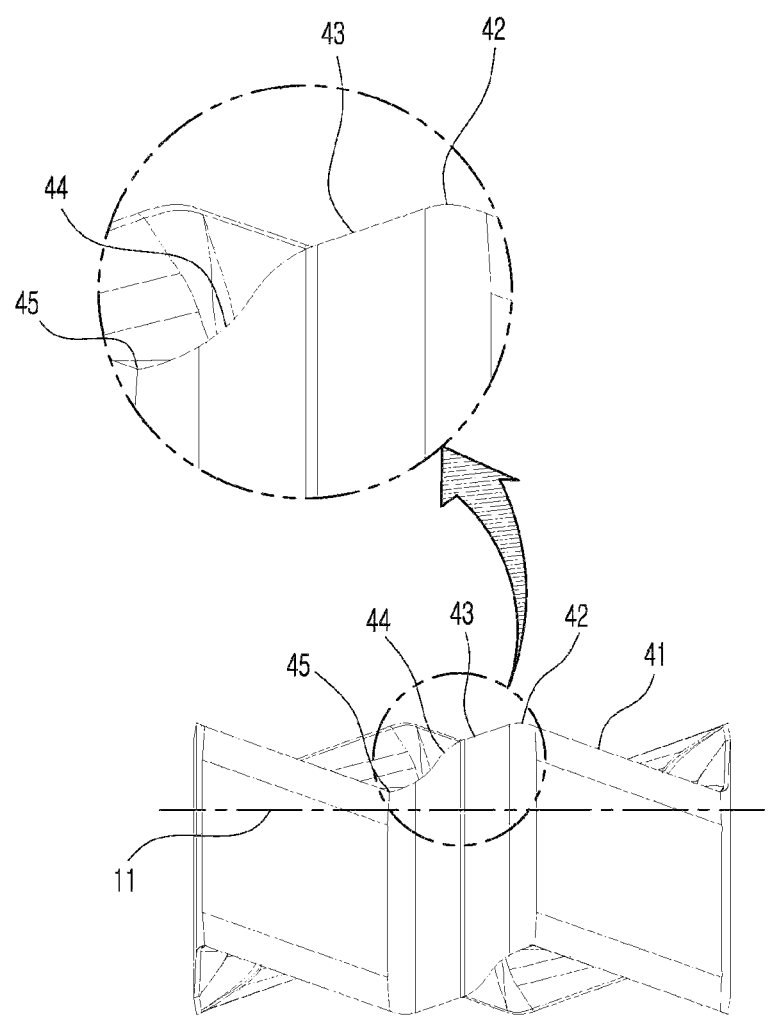
FIG. 7 is a side view of the cutting insert of FIG. 1.

As shown in FIG. 7, when the cutting insert is viewed into the side surface, the main cutting edge 41 is inclined downward in a direction away from the corner cutting edge 42, and the upper surface boss portion 11 is not higher than the lowest portion of the main cutting edge 41. Through this, it is possible to minimize the collision of the chips with the upper surface boss portion 11 during cutting, thereby improving the fluidity of the chips.

In addition, when viewing this cutting insert into the side surface (see FIG. 7), the sub-cutting edge 43 is inclined downward from the upper surface to the lower surface in a direction away from the corner cutting edge 42 (that is, in a direction approaching the non-used corner cutting edge 45 not in use), and the side portion 44 extending from the sub-cutting edge 43 forms a concave curve in the direction of the lower surface 2. This also minimizes the chips getting caught on the side portion 44 during cutting, thereby improving the fluidity of the chip.

Meanwhile, the side surface 3 includes a main cutting edge flank surface 31 extending from the main cutting edge 41, a corner cutting edge flank surface 32 extending from the corner cutting edge 42, and a sub-cutting edge flank surface 33 extending from the sub-cutting edge 43 (see FIG. 1).

As shown in FIG. 3, the first main cutting edge flank surface 31 extending from the main cutting edge 41 is of a reversely positive type. That is, the angle α formed by the extension line of the upper surface boss portion (or a parallel line C2' of the second central axis C2) and the extension line of the first main cutting edge flank surface 31 is an acute angle. In this example, the angle α formed by the parallel line C2' of the second central axis C2 and the extension line of the first main cutting edge flank surface 31 means an inward angle in the direction of a first central axis C1. The same criterion applies when defining the angles of the other surfaces of the side surface 3 to be described below.

Through this, it is possible to ensure the rigidity of the main cutting edge 41. For reference, in the present embodiment, the main cutting edge flank surface 31 extending from the main cutting edge 41 is formed into three stages, and specifically, includes the first main cutting edge flank surface 31, a second main cutting edge flank surface 32, and a third main cutting edge flank surface 33, in the direction from the upper surface 1 to the lower surface 2. In this example, the third main cutting edge flank surface 33 acts as the main cutting edge flank surface when the lower surface is used as a rake surface.

Figure 4:
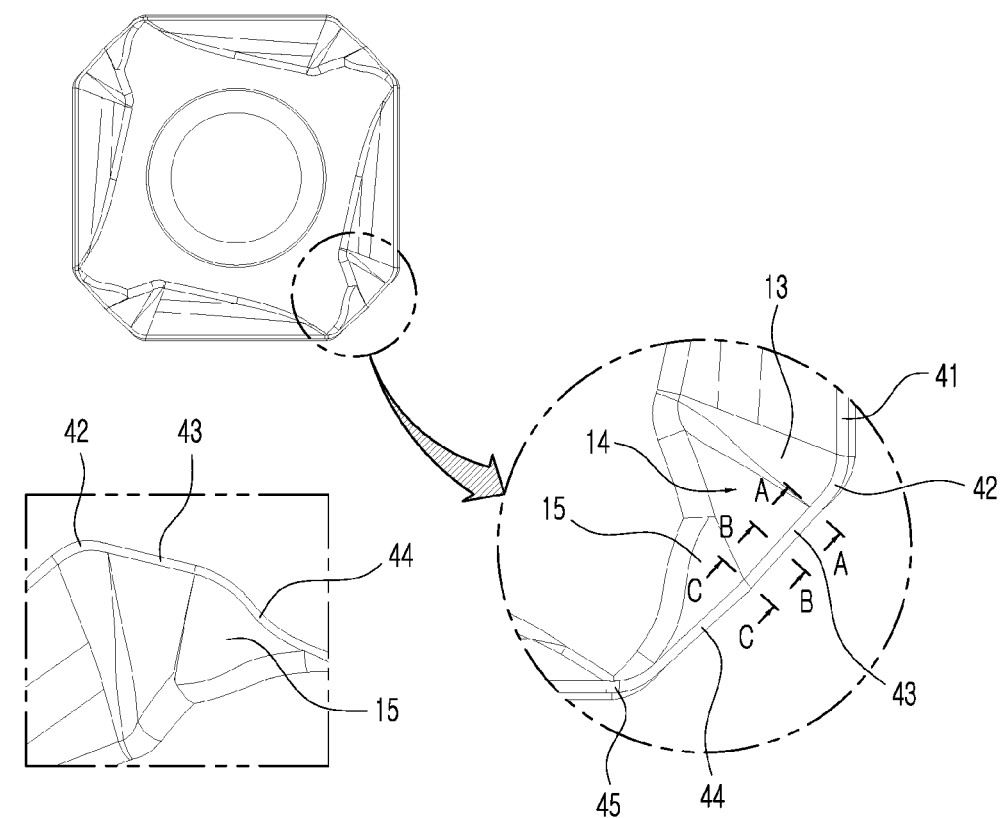
FIG. 4 is a partially enlarged view showing a variation of a clearance angle of a sub-cutting edge breaker surface of the cutting insert of FIG. 1.
Figure 4:
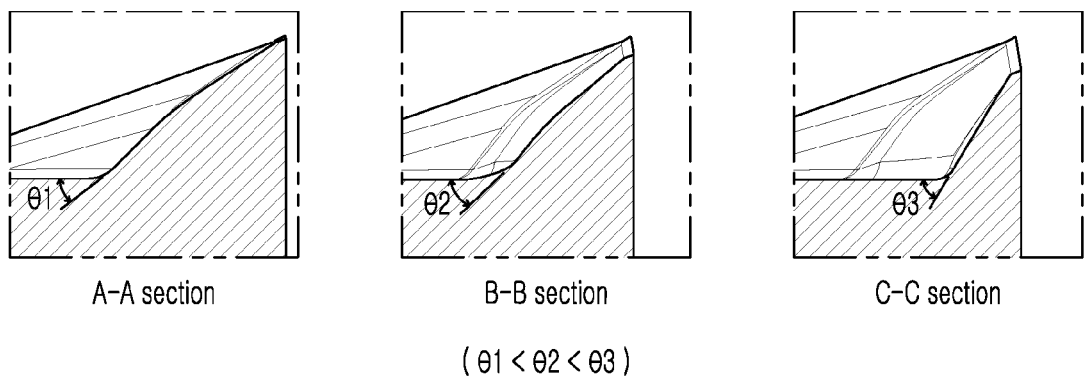

As shown in FIG. 4, a sub-cutting edge chip breaker surface 14 extending from the sub-cutting edge 43 is at an increasing angle with the upper surface boss portion 11 (that is, $\theta1<\theta2<\theta3$), as the sub-cutting edge chip breaker surface 14 is distanced away from the corner cutting edge 42 (that is, as it approaches the corner cutting edge 45 not in use). In addition, when viewed from above, a side portion surface 15 of the side portion 44 extending from the sub-cutting edge 43 is concavely recessed. Through this, it is possible to ensure good chip disposability during the workpiece processing by minimizing or preventing jamming of the chips generated from the workpiece in the direction in which the chips flow.

Figure 11:
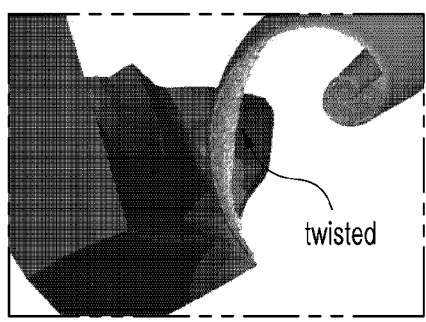
FIG. 11 shows schematic diagrams showing an effect of the cutting insert of FIG. 1.
Figure 11:
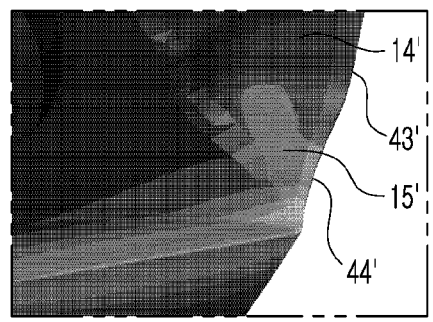
Figure 11:
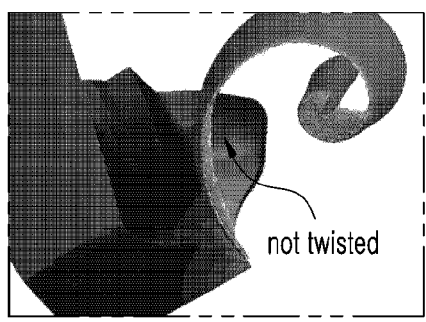
Figure 11:
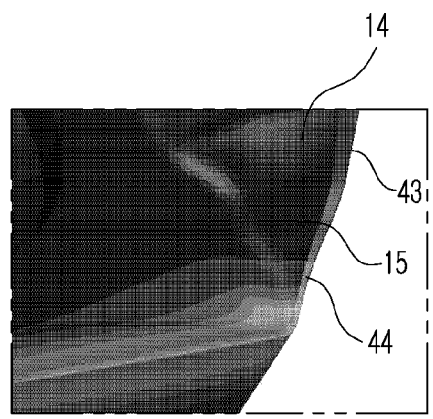
Figure 12:
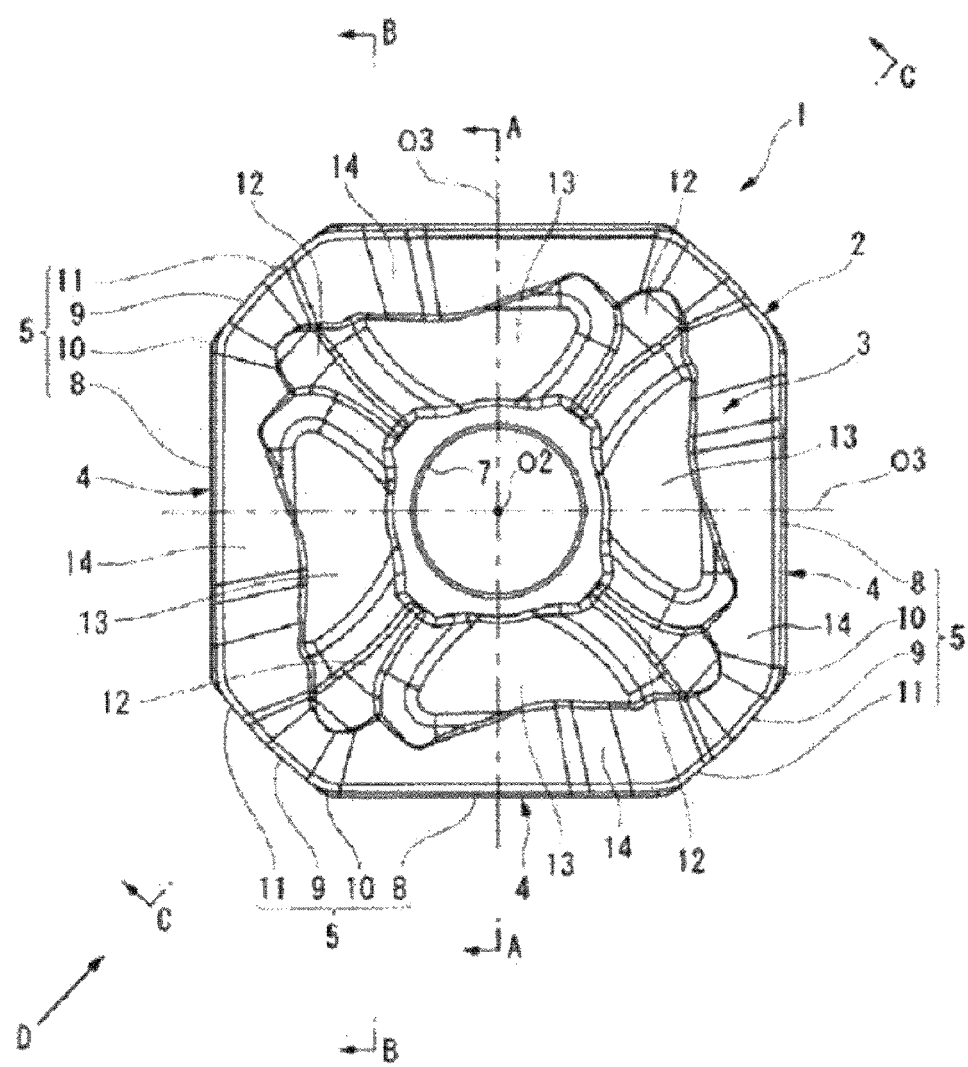
FIGS. 12 and 13 show an example of a related cutting insert.
Figure 13:
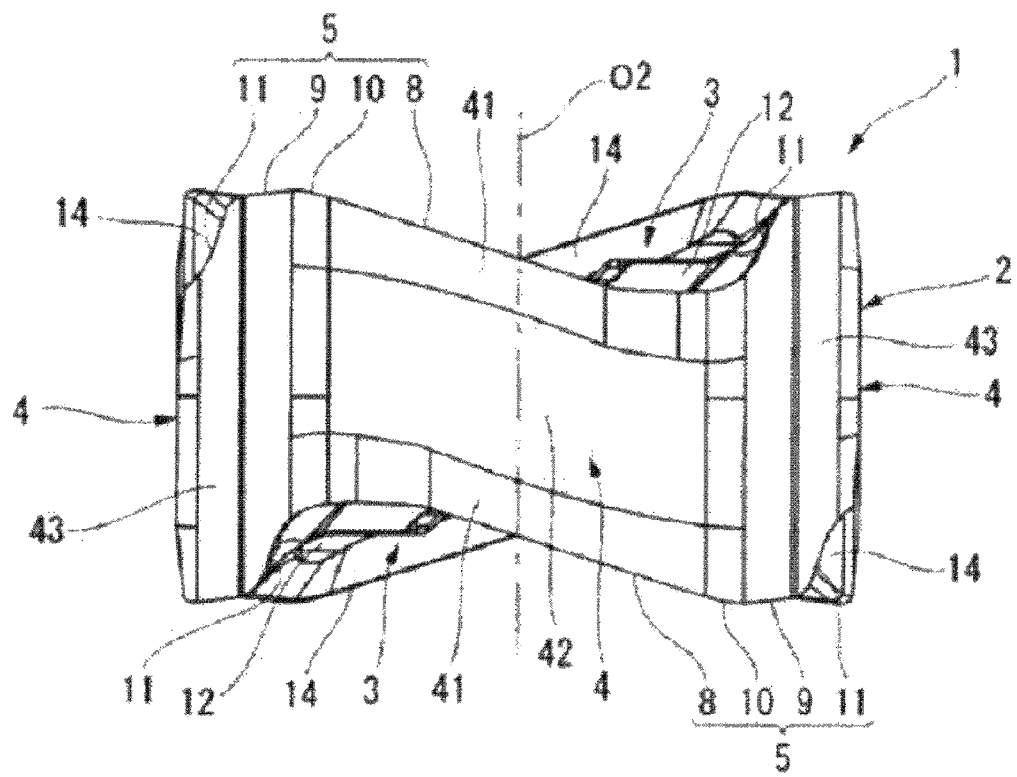

For reference, unlike the present embodiment, FIGS. 11(a) and 11(b) show a simulation result (FIG. 11(a)) showing that, when the angle of the sub-cutting edge chip breaker surface 14' extending from the sub-cutting edge 43' is kept constant, and the side portion surface 15' extending from the side portion 44' is not concavely recessed, the chips hit the side portion surface 15' while flowing, causing the wear of the surface (FIG. 11(b)), and thus resulting in the negative effect that the chips are twisted instead of being smoothly curled.

In contrast, FIGS. 11(c) and 11(d) show a simulation result showing that, in the present embodiment, the chips flow without hitting the surface of the side portion surface 15, and without causing the wear of the surface (FIG. 11(d)), and as a result, the chips are curled smoothly without being twisted, and flow well (FIG. 11(c)).

Figure 5:
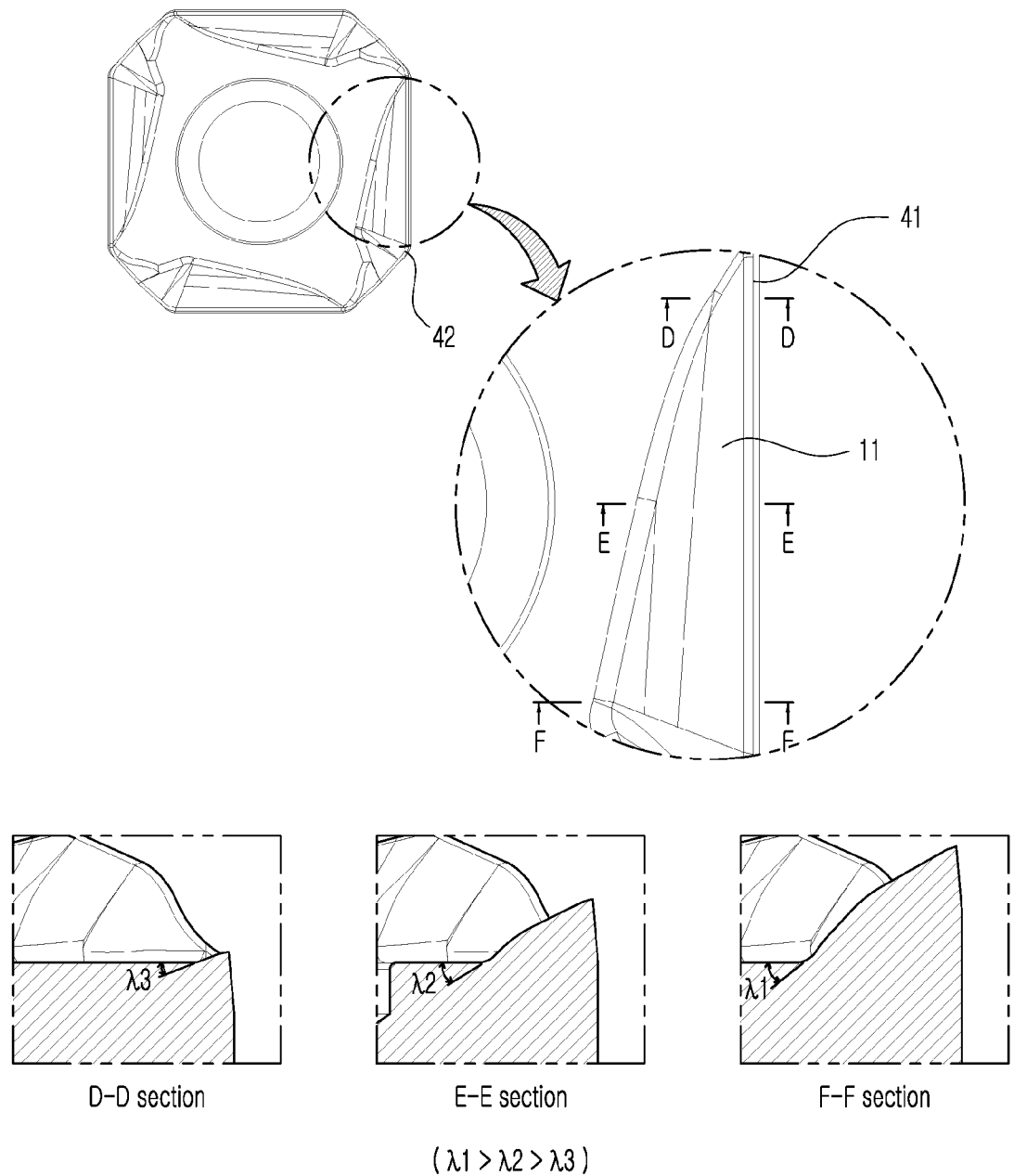
FIG. 5 is a partially enlarged view showing a variation of a clearance angle of a main cutting edge breaker surface of the cutting insert of FIG. 1.

Meanwhile, as shown in FIG. 5, a main cutting edge chip breaker surface 11 of the main cutting edge 41 is at a decreasing angle with the parallel line of the upper surface boss portion 11 (that is, $\lambda1>\lambda2>\lambda3$), as the main cutting edge chip breaker surface 11 is distanced away from the corner cutting edge 42. Through this, it is possible to ensure the rigidity of the cutting edge of the main cutting edge 41 during high-cut processing.

Figure 6:
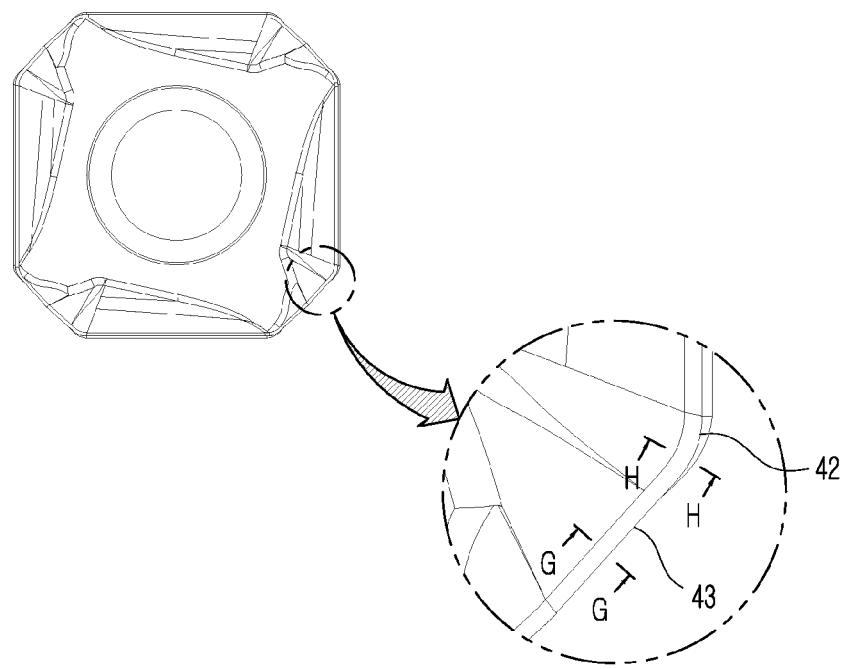
FIG. 6 shows an angle between a main cutting edge flank surface and a corner cutting edge flank surface of the cutting insert of FIG. 1.
Figure 6:
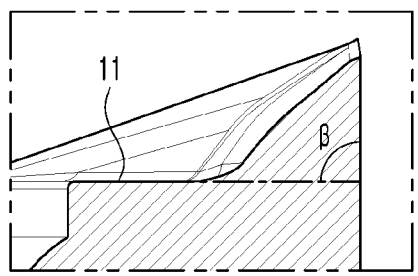
Figure 6:
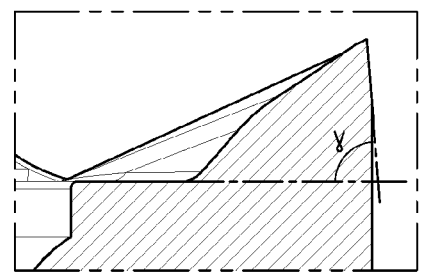

The angle $\beta$ between the sub-cutting edge flank surface 32 of the sub-cutting edge 43 and the extension line of the upper surface boss portion 11 forms a right angle (so-called negative type). Through this, it is possible to ensure the rigidity of the cutting edge of the sub-cutting edge 43 (see FIG. 6(b)).

The angle $\gamma$ formed by the corner cutting edge flank surface 33 of the corner cutting edge 42 and the extension line of the upper surface boss portion 11 is not fixed and varies along the corner cutting edge 42, and the angle $\gamma$ may have a value from a right angle (negative type) to an obtuse angle (so-called inverse positive type). Through this, it is possible to increase the rigidity of the corner cutting edge 42 (see FIG. 6(c)).

Meanwhile, as shown in FIG. 1, the cutting insert may be 180° rotationally symmetric about the first central axis C1 passing through the center of the mounting hole 5 and 180° rotationally symmetric about the second central axis C1 passing through the center of the side surface 3.

As described above, because the cutting inserts with good cutting quality are used for the stainless steel processing, the possibility of damage to the cutting insert due to the work hardened layer increases, and the cutting insert according to the present embodiment can reduce the possibility of damage to the cutting insert by configuring the main cutting edge as a reverse positive type, the sub-cutting edge as a negative type, and the flank surface of the corner cutting edge as a variable flank surface with a non-fixed clearance angle.

Hereinafter, a cutting tool 200 equipped with the cutting insert according to the embodiment of the present invention described above will be described.

Figure 8:
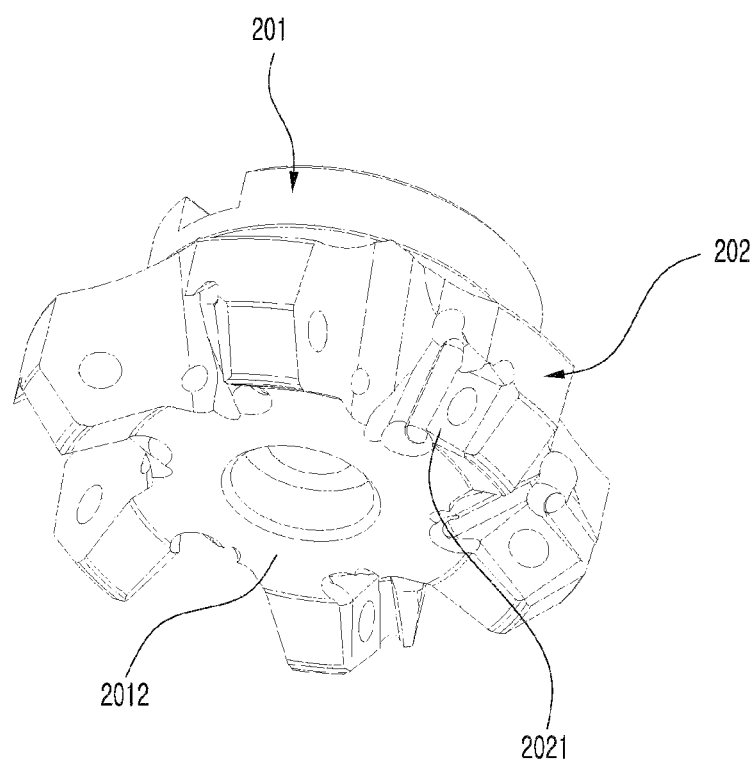
FIG. 8 is a perspective view of a cutting tool equipped with the cutting insert of FIG. 1.
Figure 9:
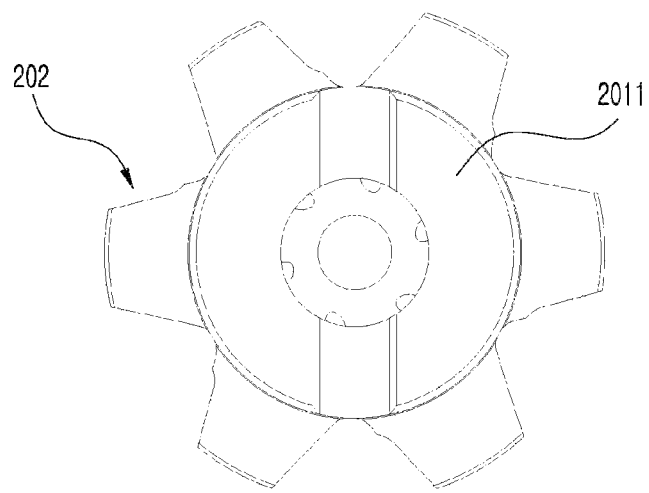
FIG. 9 shows the cutting tool of FIG. 8 viewed from a flange portion and a front end portion, respectively.
Figure 9:
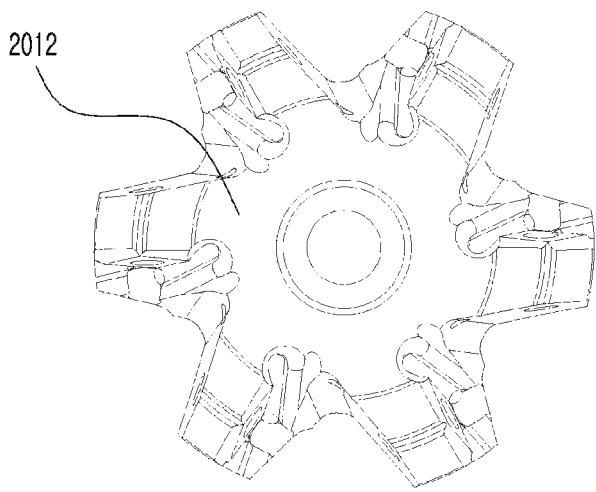
Figure 10:
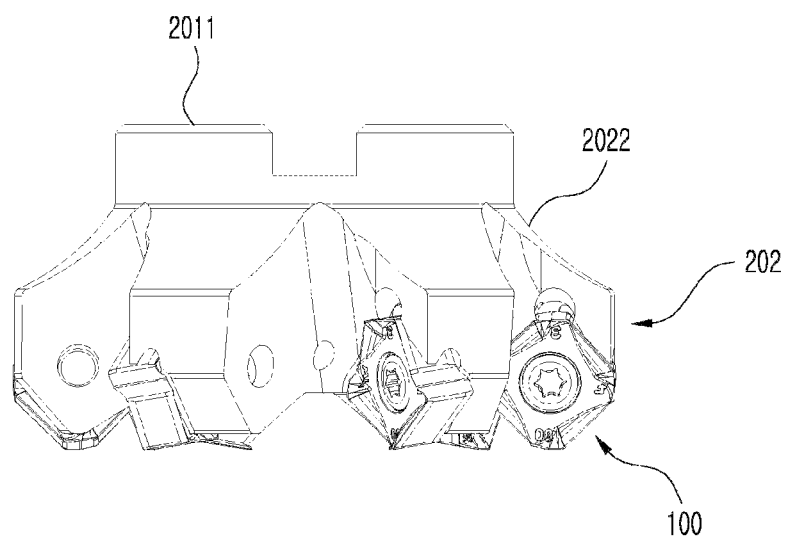
FIG. 10 is a view showing the cutting insert of FIG. 1 and the cutting tool of FIG. 8 coupled to each other.

As shown in FIGS. 8 and 9, the cutting tool 200 includes a main body 201 and a plurality of insert mounting portions 202 coupled to the main body 201.

The main body 201 has a flange portion 2011 and a front end portion 2012.

The plurality of insert mounting portions 202 protrude radially from the main body 201 and are spaced apart from each other at predetermined intervals, and include a seat portion 2021 on which the cutting insert 100 is mounted.

In particular, when the cutting tool 200 is viewed into the side, upper surfaces 2022 of the plurality of insert mounting portions 202 are formed concavely in a curved shape (see FIG. Through this, the load of the cutting tool can be reduced, thereby reducing the load during processing, and also ensuring good chip fluidity.

Although the present disclosure has been described in connection with some examples herein, the present disclosure should not be limited to those examples only, and various other changes and modifications made by those skilled in the art from the basic concept of the disclosure are also within the scope of the claims appended herein.

INDUSTRIAL APPLICABILITY

The present invention can be used for a cutting tool for cutting a workpiece.

The invention claimed is:

1. A double-sided cutting insert comprising an upper surface, a lower surface, a side surface, a cutting edge, and a mounting hole penetrating the upper surface and the lower surface, wherein
   the upper surface is provided with a single upper surface boss portion that surrounds the mounting hole and is flat,
   the cutting edge includes a main cutting edge, a corner cutting edge extending from the main cutting edge, a sub-cutting edge extending from the corner cutting edge, and a side portion extending from the sub-cutting edge,
   a first main cutting edge flank surface extending from the main cutting edge forms an acute angle with an extension line of the upper surface boss portion,
   a sub-cutting edge chip breaker surface extending from the sub-cutting edge is at a gradually increasing angle with the extension line of the upper surface boss portion, as the sub-cutting edge chip breaker surface is distanced away from the corner cutting edge, and
   when the cutting insert is viewed into the upper surface, a side portion surface extending from the side portion is concavely recessed.

2. The cutting insert according to claim 1, wherein a main cutting edge chip breaker surface of the main cutting edge is at a gradually decreasing angle with the extension line of the upper surface boss portion, as the main cutting edge chip breaker surface is distanced away from the corner cutting edge.

3. The cutting insert according to claim 1, wherein a sub-cutting edge flank surface of the sub-cutting edge forms a right angle with the extension line of the upper surface boss portion, and
    an angle formed by a corner cutting edge flank surface of the corner cutting edge and the extension line of the upper surface boss portion varies along the corner cutting edge.

4. The cutting insert according to claim 1, wherein, when the cutting insert is viewed into the side surface,
    the main cutting edge is inclined downward in a direction away from the corner cutting edge, and
    the upper surface boss portion is not higher than a lowest part of the main cutting edge.

5. The cutting insert according to claim 1, wherein, when the cutting insert is viewed into the side surface,
    the sub-cutting edge is inclined downward in a direction away from the corner cutting edge, and the side portion extending from the sub-cutting edge forms a concave curve in a direction of the lower surface.

6. The cutting insert according to claim 1, wherein the cutting insert is 180° rotationally symmetric about a first central axis passing through a center of the mounting hole, and
    is 180° rotationally symmetric about a second central axis passing through a center of the side surface.

7. A cutting tool equipped with the cutting insert according to claim 1, the cutting tool comprising:
    a main body including a flange portion and a front end portion;
    a plurality of insert mounting portions protruding radially from the main body, spaced apart from each other at predetermined intervals, and having a seat portion on which the cutting insert is mounted, wherein,
when the cutting tool is viewed into a side,
upper surfaces of the plurality of insert mounting portions are concavely formed in a curved surface.

\* \* \* \* \*